(12) United States Patent
Terrell et al.

(10) Patent No.: US 6,564,968 B1
(45) Date of Patent: May 20, 2003

(54) AUTOMATED FLUID DISPENSER

(76) Inventors: Brian Terrell, 1265 S. Remington Cir., Chandler, AZ (US) 85249; John Spilotro, 3300 N. Paseo de Los Rios, Tucson, AZ (US) 85712

( * ) Notice: Subject to any disclaimer, the term of this patent is extended or adjusted under 35 U.S.C. 154(b) by 0 days.

(21) Appl. No.: 10/264,046

(22) Filed: Oct. 3, 2002

(51) Int. Cl.[7] ................................................. G01F 11/06
(52) U.S. Cl. ........................ 222/63; 222/334; 222/341
(58) Field of Search ......................... 222/63, 334, 341, 222/386, 389, 309

(56) References Cited

U.S. PATENT DOCUMENTS

| | | | | |
|---|---|---|---|---|
| 3,207,384 A | * | 9/1965 | Wall ............................. | 222/334 |
| 3,830,405 A | * | 8/1974 | Jaeger ........................... | 222/386 |
| 6,206,241 B1 | * | 3/2001 | Terrell et al. ................ | 222/334 |

* cited by examiner

Primary Examiner—Philippe Derakshani
(74) Attorney, Agent, or Firm—Parsons & Goltry; Robert A. Parsons; Michael W. Goltry

(57) ABSTRACT

An automatic fluid dispenser includes a pump mechanism actuated by the movement of a piston between a first position and a second position. The piston includes a resilient diaphragm that separates a pump chamber from a pressurized fluid chamber. An inlet check valve in the pump chamber, biased into a closed position, allows fluid flow only into the pump chamber from a fluid source, and an outlet check valve allows fluid flow only out of the pump chamber. A valve in a conduit, coupling the pressurized fluid chamber to a pressurized fluid source, is movable between an open position in which the pressurized fluid moves the piston to the second position, dispensing fluid from the fluid chamber, and a closed position in which the pressurized fluid is bled from the pressurized fluid chamber and the piston returns to the first position, thereby drawing additional fluid into the fluid chamber.

15 Claims, 3 Drawing Sheets

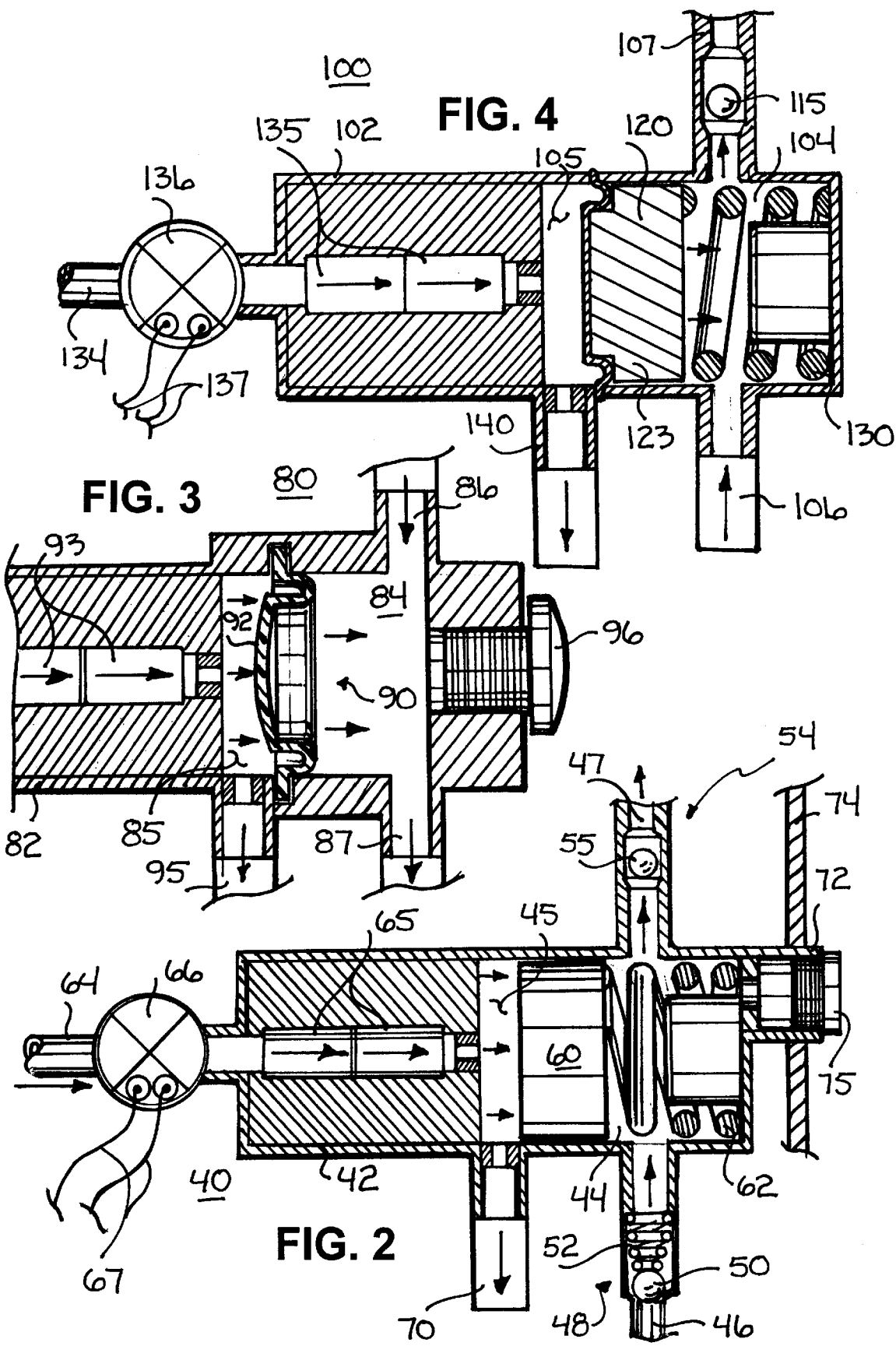

AUTOMATED FLUID DISPENSER

FIELD OF THE INVENTION

This invention relates to devices for dispensing fluids.

More particularly, the present invention relates to automated dispensing devices for automatically dispensing fluids, such as liquid soap and the like.

BACKGROUND OF THE INVENTION

Devices for dispensing fluids are well known and have been used to dispense liquid soaps, cleaning fluids, and condiments for many years. While capable of dispensing any fluid, the present invention is primarily concerned with dispensing liquid soap, which will be the primary area of discussion.

Liquid soap is typically dispensed by the reciprocal translation of a plunger that pumps liquid soap from a source and ejects it from an aperture. These dispensers require manual manipulation of the plunger. Such manipulation serves as a vehicle for transmission of bacterial and viral contaminants to subsequent users.

There also exist pneumatically actuated and mechanically (motor/pump) actuated mechanisms for dispensing soap in response to a trigger signal. These devices require a relatively substantial amount of power, usually in the form of electrical power, to maintain the air or gas pressure necessary to operate the pneumatic dispenser or to operate a motor in a mechanical dispenser. Conventional electric power (120 volts AC) creates an electrical hazard in proximity to a washbasin, or the like, reducing the desirability of devices requiring large quantities of power.

A prior art automated fluid dispenser is disclosed in U.S. Pat. No. 6,206,241 B1, issued Mar. 27, 2001, that includes some of the basic features of the present invention. This prior art dispenser includes a pump mechanism actuated by a piston movable between a first position and a second position in which a fluid is dispensed. A conduit is coupled to the pump mechanism and couplable to a pressurized fluid source. A valve is carried by the conduit and is movable between an open position in which a pressurized fluid from the pressurized fluid source moves the piston to the second position, and a closed position stopping the pressurized fluid.

It would be highly advantageous, therefore, to remedy the foregoing and other deficiencies inherent in the prior art.

Accordingly, it is an object of the present invention to provide a new and improved automatic fluid dispenser.

Another object of the invention is to provide an automatic fluid dispenser that is simpler to manufacture.

And another object of the invention is to provide an automatic fluid dispenser that includes fewer components.

SUMMARY OF THE INVENTION

Briefly, to achieve the desired objects of the instant invention in accordance with a preferred embodiment thereof, provided is an automatic fluid dispenser including a pump mechanism having a housing defining a pump chamber with a fluid inlet coupled to a fluid source and a fluid outlet. An inlet check valve is mounted in the fluid inlet of the pump chamber to allow fluid to flow only into the pump chamber from the fluid source, and an outlet check valve is mounted in the fluid outlet to allow fluid to flow only out of the pump chamber to the fluid outlet. The inlet check valve is normally biased into a closed position while the outlet check valve may be unbiased for simplification or to provide anti-drip charateristics. The housing also defines a pressurized fluid chamber.

A reciprocating element is positioned within the pressurized fluid chamber for reciprocating motion between a first position in which the pump chamber has a first volume and a second position in which the pump chamber has a second, smaller volume. In one embodiment the reciprocating element includes a resilient diaphragm that ensures fluid separation of the pump chamber and the pressurized fluid chamber. The reciprocating element is biased into the first position and in one embodiment the resilient diaphragm provides the bias. Movement of the reciprocating element from the first position to the second position causes fluid contained in the pump chamber to be dispensed and movement of the reciprocating element from the second position to the first position causes fluid to be drawn into the pump chamber from the fluid source.

A pressurized fluid conduit is couplable to a pressurized fluid source and is coupled to the pressurized fluid chamber to supply pressurized fluid to the reciprocating element for moving the reciprocating element from the first position to the second position. A valve is carried by the pressurized fluid conduit. The valve is movable between an open position in which a pressurized fluid from the pressurized fluid source moves the reciprocating element to the second position and a closed position stopping the pressurized fluid. A pressurized fluid bleed is coupled to the pressurized fluid chamber adjacent the reciprocating element for relieving pressure in the pressurized fluid chamber when the valve is in the closed position. Relieving the pressure allows the biasing element to return the reciprocating element to the first position, which draws additional fluid into the fluid chamber from the fluid source. A sensor is used to actuate the valve from the closed position to the open position, the valve being normally biased to the closed position.

Also, the new and improved automatic fluid dispenser can be used in a variety of modern appliances to automatically introduce a fluid (e.g., soap, cleaner, softener, etc.) into the appliance during a selected portion of the operating cycle.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 2 is an enlarged sectional view of one embodiment of a pump mechanism in an automatic fluid dispenser according to the present invention;

FIG. 3 is an enlarged sectional view of another embodiment of a pump mechanism in an automatic fluid dispenser according to the present invention;

FIG. 4 is an enlarged sectional view of another embodiment of a pump mechanism in an automatic fluid dispenser according to the present invention;

DETAILED DESCRIPTION OF THE PREFERRED EMBODIMENTS

Figure 1:
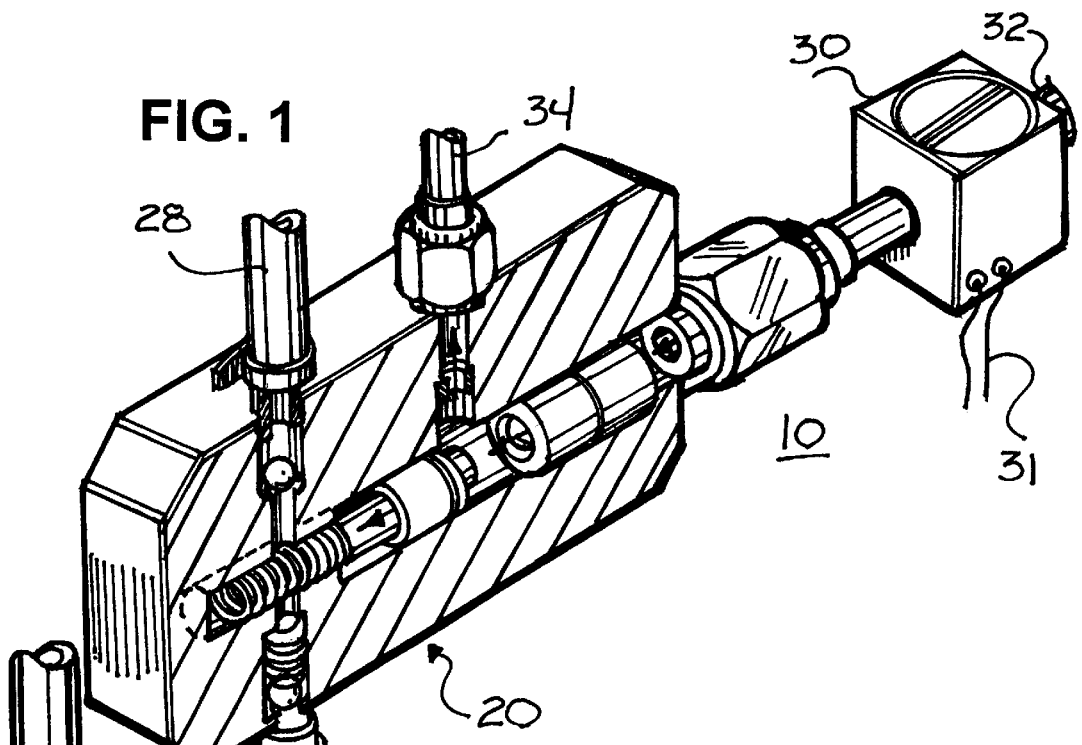
FIG. 1 is a sectional perspective view of a pump mechanism in an automatic fluid dispenser, generally illustrating the relative positions of the various components.

Turning now to the drawings, attention is first directed to FIG. 1, which illustrates an automatic fluid dispenser, generally designated 10. Dispenser 10 includes a pump assembly 20 coupled to a reservoir (not shown in this figure) by a conduit 24, and an outlet fixture (not shown in this figure) by a conduit 28. An actuating assembly controls the operation of pump assembly 20 by regulating a flow of pressurized water. Upon release of pressurized water to pump assembly 20 a quantity of fluid is dispensed.

The actuating assembly includes a valve 30 opened and closed, in a preferred embodiment, by a solenoid or the like upon triggering of a sensor, generally mounted external of the valve and represented herein by wires 31, and a pressurized fluid conduit 32, such as a standard water supply pipe. Additionally, a bleed conduit 34 is coupled between pump mechanism 20 and an outlet of the automatic fluid dispenser. As will be described presently, bleed conduit 34 allows the elimination of pressurized fluid employed to operate pump mechanism 20. In the preferred embodiment, all of the elements described are mounted generally as illustrated.

Referring now to FIG. 2, an enlarged sectional view is illustrated of one embodiment of a pump mechanism 40 in an automatic fluid dispenser according to the present invention. Pump mechanism 40 includes a housing 42 defining a pump chamber 44 and a pressurized fluid chamber 45. Pump chamber 44 includes a fluid inlet 46 connected to a source of fluid (not shown in this figure) and a fluid outlet 47. An inlet check valve 48 mounted in fluid inlet 46, in this preferred embodiment includes a ball 50 biased into a closed position by a compression spring 52. Inlet check valve 48 is positioned to allow fluid to flow only into pump chamber 44 from fluid inlet 46. An outlet check valve 54 mounted in fluid outlet 47, in this preferred embodiment includes a free-floating or unbiased ball 55. Outlet check valve 54 is positioned to allow fluid to flow only out of pump chamber 44 through fluid outlet 47.

Biasing of ball 55 into a closed position can be eliminated for simplicity of the valve, if desired, because the movement of reciprocating element 60 from the second position to the first position will first draw ball 55 to close check valve 54 and then open check valve 48 and draw fluid from the fluid source, by way of fluid inlet 46, into pump chamber 44. When the fluid being dispensed is, for example, liquid soap or other viscose liquid, the viscosity is high enough to delay ball 55 being drawn into the closed position where it remains until the next dispensing cycle. The delay acts to prevent any dripping of the fluid from fluid outlet 47. Dripping is prevented by fluid being drawn back toward pump chamber 44 during the beginning period of element 60 moving back to the first position. This occurs during the delay period before ball 55 moves into the closed position. The delay can be adjusted by the mass of ball 55 and viscosity of the fluid. By not requiring a bias, such as a compression spring or the like, in check valve 54, the valve can be manufactured (or otherwise provided) much easier and cheaper.

A reciprocating element 60 is positioned in housing 42 so as to separate pump chamber 44 from pressurized fluid chamber 45. In this embodiment it is anticipated that reciprocating element 60 is sufficiently tight to prevent the flow of fluid between pump chamber 44 and pressurized fluid chamber 45, while allowing reciprocating movements. Reciprocating element 60 has a first position, generally at the left extreme of its movement (illustrated in FIG. 2), and a second position in which it is displaced to the right in FIG. 2. Reciprocating element 60 is biased into the first position, in this embodiment, by a compression spring 62 positioned in fluid chamber 44. In the first position of reciprocating element 60, pump chamber 44 has a first volume and in the second position of reciprocating element 60 pump chamber 44 has a second smaller volume, which causes fluid contained in the pump chamber to be dispensed.

A pressurized fluid conduit 64 is couplable to a pressurized fluid source (not shown) and couples the fluid source to pressurized fluid chamber 45 to supply pressurized fluid to a surface of reciprocating element 60 for moving reciprocating element 60 from the first position to the second position. Pressurized fluid conduit 64 generally includes standard check valves 65, required when a standard water pipe is the fluid source, to prevent any fluid in pressurized fluid chamber 45 from returning through conduit 64 to the pressurized fluid source. A valve 66 is carried by pressurized fluid conduit 64 and is movable between an open position in which a pressurized fluid from the pressurized fluid source flows into pressurized fluid chamber 45 to move reciprocating element 60 to the second position, and a closed position stopping the pressurized fluid. Valve 66 is opened and closed, in a preferred embodiment, by a solenoid or the like upon triggering of a sensor, generally mounted external of the valve and represented herein by wires 67. A pressurized fluid bleed 70 is coupled to pressurized fluid chamber 45 adjacent the pressure receiving surface of reciprocating element 60 in pressurized fluid chamber 45. Pressurized fluid bleed 70 is provided to relieve pressure on the pressure receiving surface when the valve is in the closed position to allow compression spring 62 to return reciprocating element 60 to the first position.

Pump mechanism 40 includes a mounting collar 72 illustrated as extending through a wall 74. An opening is provided in mounting collar 72 with a plug 75 threadedly engaged therein. Plug 75 is optionally provided as an adjustable stop for varying the initial compression on spring 62 and, thus, the bias on reciprocating element 60 and can also act as a drain plug to purge the system of fluid. Adjusting the bias on reciprocating element 60 is one method for adjusting the amount of fluid dispensed during a cycle. Other methods may include, for example, adjustable stops for changing the first and/or second positions of reciprocating element 60, adjustable elements for changing the size of pump chamber 44, etc.

The forward stroke, movement from position one to position two, of reciprocating element 60 is produced by the release of pressurized fluid from conduit 64 by valve 66. In a preferred embodiment, valve 66 is biased closed and is opened for a brief period by a solenoid or the like and is then automatically closed. The surge of pressurized fluid drives reciprocating element 60 in the forward stroke. The pressurized fluid is then bled away through Pressurized fluid bleed 70. The bled off fluid can be disposed of in many different manners. Bleed 70 can direct the fluid directly to a drain pipe, mix the fluid with the dispensed fluid, etc.

Turning now to FIG. 3, another embodiment of a pump mechanism 80 is illustrated in an automatic fluid dispenser according to the present invention. Pump mechanism 80 includes a housing 82 defining a pump chamber 84 and a pressurized fluid chamber 85. Pump chamber 84 includes a fluid inlet 86 connected to a source of fluid (not shown in this figure) and a fluid outlet 87. An inlet check valve (not shown) is mounted in fluid inlet 86 and biased into a closed position so as to allow fluid to flow only into pump chamber 84 from fluid inlet 86. An outlet check valve (not shown) is mounted in fluid outlet 87 so as to allow fluid to flow only out of pump chamber 84 through fluid outlet 87.

A reciprocating element 90 is positioned in housing 82 so as to separate pump chamber 84 from pressurized fluid chamber 85. In this embodiment reciprocating element 90 includes a resilient diaphragm 92 separating pump chamber 84 from pressurized fluid chamber 85. Here it should be understood that diaphragm 92 can, for example, be ring-shaped, rather than disk-shaped, so as to be positioned only around the edges of a centrally located piston and is not necessarily a complete wall between pump chamber 84 and pressurized fluid chamber 85. Diaphragm 92 can be formed of rubber, various plastics, metal, etc. Diaphragm 92 prevents the flow of fluid between pump chamber 84 and pressurized fluid chamber 85. Further, resilient diaphragm 92 is constructed to have a first or normal position (generally as illustrated in FIG. 3) and a second position displaced to the right. In the first position of diaphragm 92, pump chamber 84 has a first volume and in the second position of diaphragm 92 pump chamber 84 has a second smaller volume, which causes fluid contained in the pump chamber to be dispensed. Further, in this embodiment, the resiliency of diaphragm 92 provides a bias that tends to return diaphragm 92 to the first or normal position when fluid pressure within chamber 85 is removed or reduced.

A pressurized fluid conduit (not shown in FIG. 3) is couplable to a pressurized fluid source (not shown) and couples the fluid source to pressurized fluid chamber 85 to supply pressurized fluid to a surface of reciprocating element 90 for moving reciprocating element 90 from the first position to the second position. The pressurized fluid conduit generally includes standard check valves 93, required when a standard water pipe is the fluid source, to prevent any fluid in pressurized fluid chamber 85 from returning through the pressurized fluid conduit to the pressurized fluid source. A valve (not shown in FIG. 3) is carried by the pressurized fluid conduit and is movable between an open position in which a pressurized fluid from the pressurized fluid source flows into pressurized fluid chamber 85 to move reciprocating element 90 to the second position, and a closed position stopping the pressurized fluid. The valve is opened and closed, in a preferred embodiment, by a solenoid or the like upon triggering of a sensor, generally mounted external of the valve. A pressurized fluid bleed 95 is coupled to pressurized fluid chamber 85 adjacent the pressure receiving surface of reciprocating element 90 in pressurized fluid chamber 85. Pressurized fluid bleed 95 is provided to relieve pressure on the pressure receiving surface when the valve is in the closed position to allow reciprocating element 90 to return to the first position.

An opening is provided in housing 82 with a plug 96 threadedly engaged therein. Plug 96 is optionally provided as an adjustment for varying the initial volume of pump chamber 84 and to act as a drain plug. Adjusting the volume of pump chamber 84 is one method for adjusting the amount of fluid dispensed during a cycle. Other methods may include, for example, adjustable stops for changing the first and/or second positions of reciprocating element 90, other adjustable elements for changing the size of pump chamber 84, etc.

Turning now to FIG. 4, another embodiment of a pump mechanism 100 is illustrated in an automatic fluid dispenser according to the present invention. Pump mechanism 100 includes a housing 102 defining a pump chamber 104 and a pressurized fluid chamber 105. Pump chamber 104 includes a fluid inlet 106 connected to a source of fluid (not shown in this figure) and a fluid outlet 107. An inlet check valve (not shown) is mounted in fluid inlet 106 and biased into a closed position so as to allow fluid to flow only into pump chamber 104 from fluid inlet 106. An outlet check valve 114 mounted in fluid outlet 107, in this preferred embodiment includes a free-floating or unbiased ball 115. Outlet check valve 114 is positioned to allow fluid to flow only out of pump chamber 104 through fluid outlet 107.

A reciprocating element 120 is positioned in housing 102 so as to separate pump chamber 104 from pressurized fluid chamber 105. In this embodiment reciprocating element 120 includes a resilient diaphragm 122 separating pump chamber 104 from pressurized fluid chamber 105. Diaphragm 122 provides a positive fluid barrier to prevent the flow of fluid between pump chamber 104 and pressurized fluid chamber 105. Here it should be understood that diaphragm 122 can, for example, be ring-shaped, rather than disk-shaped, so as to be positioned only around the edges of a piston 123 to operate as a fluid barrier and is not necessarily a complete wall between pump chamber 104 and pressurized fluid chamber 105. Further, resilient diaphragm 122 is constructed to allow movement between a first or normal position of reciprocating element 120 (generally as illustrated in FIG. 3) and a second position displaced to the right.

Reciprocating element 120 is biased into the first position, in this embodiment, by a compression spring 130 positioned in pump chamber 104. In the first position of reciprocating element 120, pump chamber 104 has a first volume and in the second position of reciprocating element 120 pump chamber 104 has a second smaller volume, which causes fluid contained in pump chamber 104 to be dispensed. Further, in this embodiment, the resiliency of diaphragm 122 may or may not provide some bias that tends to return diaphragm 122 to the first or normal position when fluid pressure within chamber 105 is removed or reduced.

Biasing of ball 115 in outlet check valve 114 into a closed position can be eliminated for simplicity of the valve, if desired, because the movement of reciprocating element 120 from the second position to the first position will first draw ball 115 to close check valve 114 and then open the inlet check valve and draw fluid from the fluid source, by way of the fluid inlet, into pump chamber 104. When the fluid being dispensed is, for example, liquid soap or other viscose liquid, the viscosity is high enough to delay ball 115 being drawn into the closed position where it remains until the next dispensing cycle. The delay acts to prevent any dripping of the fluid from the fluid outlet. Dripping is prevented by fluid being drawn back toward pump chamber 104 during the beginning period of element 120 moving back to the first position. This occurs during the delay period, before ball 115 moves into the closed position. By not requiring a bias, such as a compression spring or the like, in check valve 114, the valve can be manufactured (or otherwise provided) much easier and cheaper.

A pressurized fluid conduit 134 is couplable to a pressurized fluid source (not shown) and couples the fluid source to pressurized fluid chamber 105 to supply pressurized fluid to a surface of reciprocating element 120 for moving reciprocating element 120 from the first position to the second position. Pressurized fluid conduit 134 generally includes standard check valves 135, required when a standard water pipe is the fluid source, to prevent any fluid in pressurized fluid chamber 135 from returning through conduit 134 to the pressurized fluid source. A valve 136 is carried by pressurized fluid conduit 134 and is movable between an open position in which a pressurized fluid from the pressurized fluid source flows into pressurized fluid chamber 105 to move reciprocating element 120 to the second position, and a closed position stopping the pressurized fluid. Valve 136 is opened and closed, in a preferred embodiment, by a solenoid or the like upon triggering of a sensor, generally mounted external of the valve and represented herein by wires 137. A pressurized fluid bleed 140 is coupled to pressurized fluid chamber 105 adjacent the pressure receiving surface of reciprocating element 120 in pressurized fluid chamber 105. Pressurized fluid bleed 140 is provided to relieve pressure on the pressure receiving surface when the valve is in the closed position to allow compression spring 130 to return reciprocating element 120 to the first position.

Figure 5:
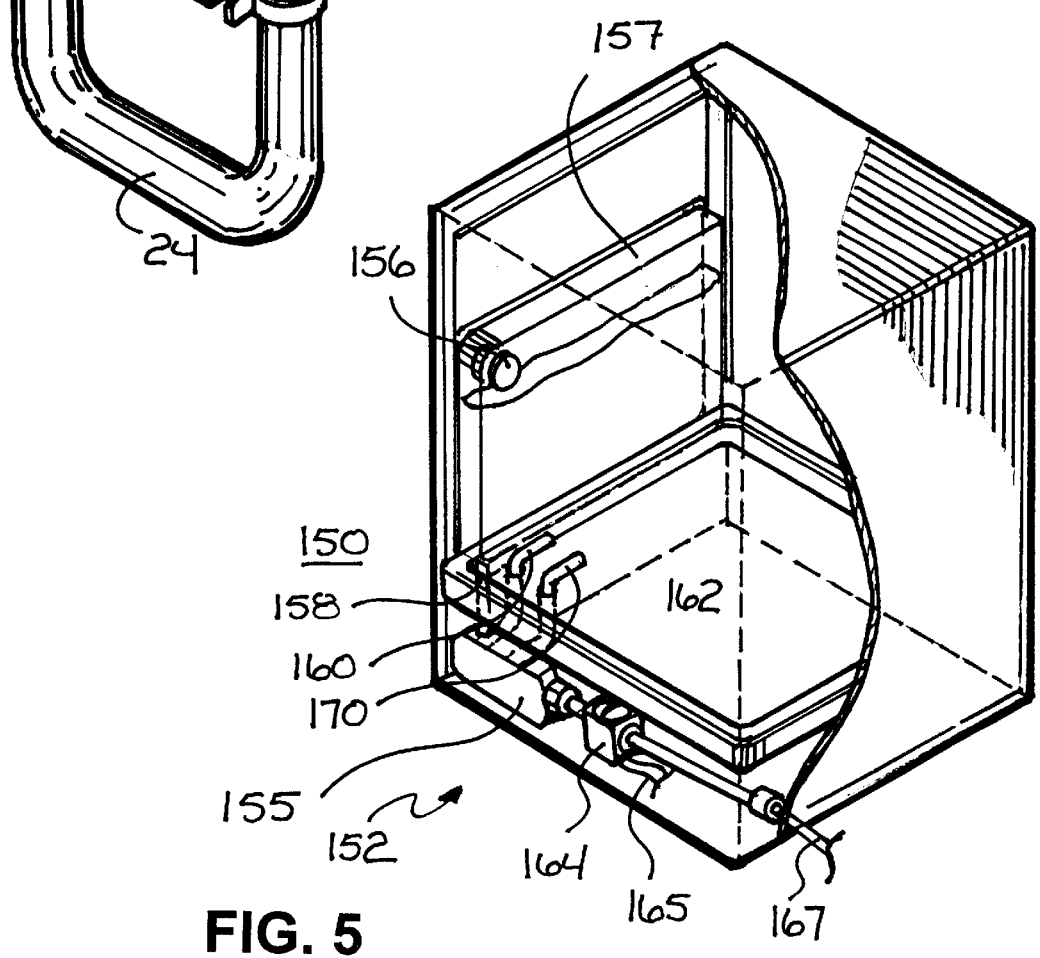
FIG. 5 is a view in perspective, portions thereof broken away, of a dish washer including an automatic fluid dispenser according to the present invention.

Turning now to FIG. 5, a dishwasher, generally designated 150, including an automatic fluid dispenser 152 according to the present invention, is illustrated. Automatic fluid dispenser 152 includes a pump mechanism 155 (e.g., similar to pump mechanism 40, 80, or 100) coupled to a reservoir 157 by a conduit 158, and an outlet conduit 160 extends into a dish receiving area 162 of dish washer 150. Reservoir 157 can be, for example, a relatively large flat tank positioned on or in one wall of dishwasher 150 with an externally accessible opening 156 for supplying soap or other cleaning material thereto. An actuating assembly controls the operation of pump mechanism 155 by regulating a flow of pressurized water and includes a valve 164 opened and closed, in a preferred embodiment, by a solenoid or the like upon triggering by a sensory electrical signal supplied on wires 165, and a pressurized fluid conduit 167, such as a standard water supply pipe. The sensory electrical signal supplied on wires 165 is provided by the standard timing and activating circuit in dishwasher 150 for operation at a selected time during a washing cycle. Additionally, a bleed conduit 170 is coupled between pump mechanism 155 and dish receiving area 162 of dishwasher 150. In the preferred embodiment, all of the elements described are mounted generally as illustrated.

Figure 6:
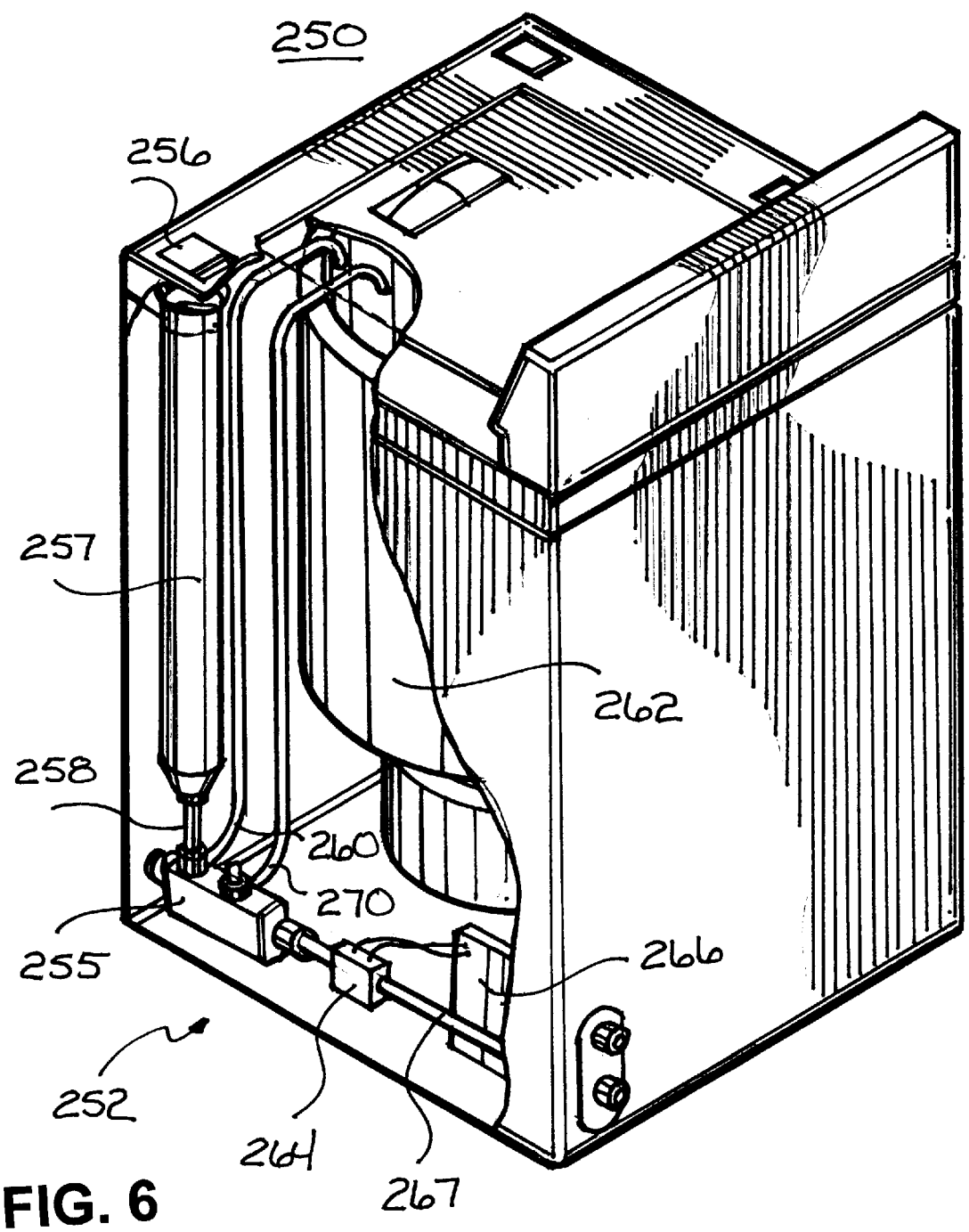
FIG. 6 is a view in perspective, portions thereof broken away, of a clothes washing machine including an automatic fluid dispenser according to the present invention.

Turning now to FIG. 6, a clothes washing machine, generally designated 250, including an automatic fluid dispenser 252 according to the present invention, is illustrated. Automatic fluid dispenser 252 includes a pump mechanism 255 (e.g., similar to pump mechanism 40, 80, or 100) coupled to a reservoir 257 by a conduit 258, and an outlet conduit 260 extends into a clothes receiving tub 262 of clothes washing machine washer 250. Reservoir 257 can be, for example, a relatively large cylinder positioned in a corner of dishwasher 150 with an externally accessible opening 256 for supplying soap or other cleaning material thereto. An actuating assembly controls the operation of pump mechanism 255 by regulating a flow of pressurized water and includes a valve 264 opened and closed, in a preferred embodiment, by a solenoid or the like upon triggering by a sensory electrical signal supplied on wires 265, and a pressurized fluid conduit 267, such as a standard water supply pipe. The sensory electrical signal supplied on wires 265 is provided by a standard tinting and activating circuit 266 in clothes washing machine 250 for operation at a selected time during a washing cycle. Additionally, a bleed conduit 270 is coupled between pump mechanism 255 and clothes receiving tub 262 of clothes washing machine 250. In the preferred embodiment, all of the elements described are mounted generally as illustrated.

Thus, a new and improved automatic fluid dispenser is disclosed which has several advantages not specifically delineated in the above disclosed U.S. patent. For example, the outlet fluid check valve can be simplified by not including biasing apparatus. The reciprocating element can be made with a resilient diaphragm that biases the reciprocating element into the first position. In addition or instead of the biasing, the diaphragm can provide a positive fluid barrier between the pump chamber and the pressurized fluid chamber to ensure no leakage therebetween. Also, the new and improved automatic fluid dispenser can be used in a variety of modern appliances to automatically introduce a fluid (e.g., soap, cleaner, softener, etc.) into the appliance during a selected portion of the operating cycle.

Various changes and modifications to the embodiments herein chosen for purposes of illustration will readily occur to those skilled in the art. For example, one skilled in the art will understand that substantially any fluid can be dispensed and the device can be driven by a variety of pressurized fluid sources. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An automatic fluid dispenser comprising:

a pump mechanism including a housing defining a pump chamber having a fluid inlet coupled to a fluid source and a fluid outlet, an inlet check valve mounted in the fluid inlet of the pump chamber for allowing fluid to flow only into the pump chamber from the fluid source, and an outlet check valve mounted in the fluid outlet for allowing fluid to flow only out of the pump chamber to the fluid outlet, the inlet check valve being normally biased into a closed position;

a reciprocating element positioned within the pump chamber for reciprocating motion between a first position in which the pump chamber has a first volume and a second position in which the pump chamber has a second, smaller volume causing fluid contained in the pump chamber to be dispensed, the reciprocating element defining a pressure receiving surface;

a biasing element included in the pump mechanism for biasing the reciprocating element into the first position;

a pressurized fluid conduit couplable to a pressurized fluid source and coupled to the pressure receiving surface of the reciprocating element to supply pressurized fluid to the pressure receiving surface of the reciprocating element for moving the reciprocating element from the first position to the second position;

a valve carried by the pressurized fluid conduit and movable between an open position in which a pressurized fluid from the pressurized fluid source moves the reciprocating element to the second position, and a closed position stopping the pressurized fluid;

a pressurized fluid bleed coupled to the pressurized fluid source adjacent the pressure receiving surface for relieving pressure on the pressure receiving surface when the valve is in the closed position to allow the biasing element to return the reciprocating element to the first position; and a sensor for actuating the valve from the closed position to the open position, the valve being normally biased to the closed position.

2. An automatic fluid dispenser as claimed in claim 1 wherein the reciprocating element and the biasing element include a resilient diaphragm affixed to the pump mechanism housing to provide a reciprocating portion with a bias.

3. An automatic fluid dispenser as claimed in claim 1 wherein the outlet check valve is unbiased.

4. An automatic fluid dispenser as claimed in claim 1 including a clothes washing machine with a central clothes receiving tub, the fluid outlet of the pump chamber and the pressurized fluid bleed being in fluid communication with the clothes receiving tub.

5. An automatic fluid dispenser as claimed in claim 4 wherein the valve carried by the pressurized fluid conduit is operated electrically, the valve being electrically coupled to an electrical timing and activating circuit in the clothes washing machine for operation at a selected time during a washing cycle.

6. An automatic fluid dispenser as claimed in claim 1 including a dishwasher with a central dish receiving area, the fluid outlet of the pump chamber and the pressurized fluid bleed being in fluid communication with the dish receiving area.

7. An automatic fluid dispenser as claimed in claim 6 wherein the valve carried by the pressurized fluid conduit is operated electrically, the valve being electrically coupled to an electrical timing and activating circuit in the dishwasher for operation at a selected time during a washing cycle.

8. An automatic fluid dispenser comprising:

a pump mechanism including a housing defining a pump chamber having a fluid inlet coupled to a fluid source and a fluid outlet and a pressurized fluid chamber in communication with the pump chamber, an inlet check valve mounted in the fluid inlet of the pump chamber for allowing fluid to flow only into the pump chamber from the fluid source, and an outlet check valve mounted in the fluid outlet for allowing fluid to flow only out of the pump chamber to the fluid outlet, the inlet check valve being normally biased into a closed position;

a reciprocating element including a resilient diaphragm positioned within the pressurized fluid chamber and separating the pressurized fluid chamber from the pump chamber, the reciprocating element being mounted for reciprocating motion between a first position in which the pump chamber has a first volume and a second position in which the pump chamber has a second, smaller volume, the reciprocating element being biased into the first position, movement of the reciprocating element into the second position causing fluid contained in the pump chamber to be dispensed through the outlet from the pump chamber and return movement of the reciprocating element into the first position causing fluid to be drawn from the inlet into the pump chamber;

a pressurized fluid conduit couplable to a pressurized fluid source and coupled to the pressurized fluid chamber for moving the reciprocating element under pressure of a pressurized fluid from the first position to the second position;

a valve carried by the pressurized fluid conduit and movable between an open position in which a pressurized fluid from the pressurized fluid source moves the reciprocating element to the second position and a closed position stopping the pressurized fluid;

a pressurized fluid bleed coupled to the pressurized fluid chamber for relieving pressure on the pressure receiving surface when the valve is in the closed position to allow the bias to return the reciprocating element to the first position; and a sensor for actuating the valve from the closed position to the open position, the valve being normally biased to the closed position.

9. An automatic fluid dispenser as claimed in claim 8 wherein the outlet check valve is unbiased.

10. An automatic fluid dispenser as claimed in claim 8 including a clothes washing machine with a central clothes receiving tub, the fluid outlet of the pump chamber and the pressurized fluid bleed being in fluid communication with the clothes receiving tub.

11. An automatic fluid dispenser as claimed in claim 10 wherein the valve carried by the pressurized fluid conduit is operated electrically, the valve being electrically coupled to an electrical timing and activating circuit in the clothes washing machine for operation at a selected time during a washing cycle.

12. An automatic fluid dispenser as claimed in claim 8 including a dishwasher with a central dish receiving area, the fluid outlet of the pump chamber and the pressurized fluid bleed being in fluid communication with the dish receiving area.

13. An automatic fluid dispenser as claimed in claim 12 wherein the valve carried by the pressurized fluid conduit is operated electrically, the valve being electrically coupled to an electrical timing and activating circuit in the dishwasher for operation at a selected time during a washing cycle.

14. An automatic fluid dispenser as claimed in claim 8 wherein the resilient diaphragm included in the reciprocating element provides the bias that biases the reciprocating element into the first position.

15. An automatic fluid dispenser as claimed in claim 8 further including a compression spring positioned in the pump chamber to provide the bias that biases the reciprocating element into the first position.

\* \* \* \* \*

UNITED STATES PATENT AND TRADEMARK OFFICE
CERTIFICATE OF CORRECTION

PATENT NO.   : 6,564,968 B1
DATED        : May 20, 2003
INVENTOR(S)  : Terrell, Brian and Spilotro, John It is certified that error appears in the above-identified patent and that said Letters Patent is hereby corrected as shown below:

<u>Column 1,</u>
Line 54, replace "tinting" with -- timing --.

Signed and Sealed this

Third Day of February, 2004

JON W. DUDAS
*Acting Director of the United States Patent and Trademark Office*